H. GALOPIN.
SPEED, TIME, AND QUANTITY RECORDING INSTRUMENT.
APPLICATION FILED JAN. 3, 1922.

1,421,352.

Patented June 27, 1922.
4 SHEETS—SHEET 1.

Inventor.
Henri Galopin
By [signature]
Atty

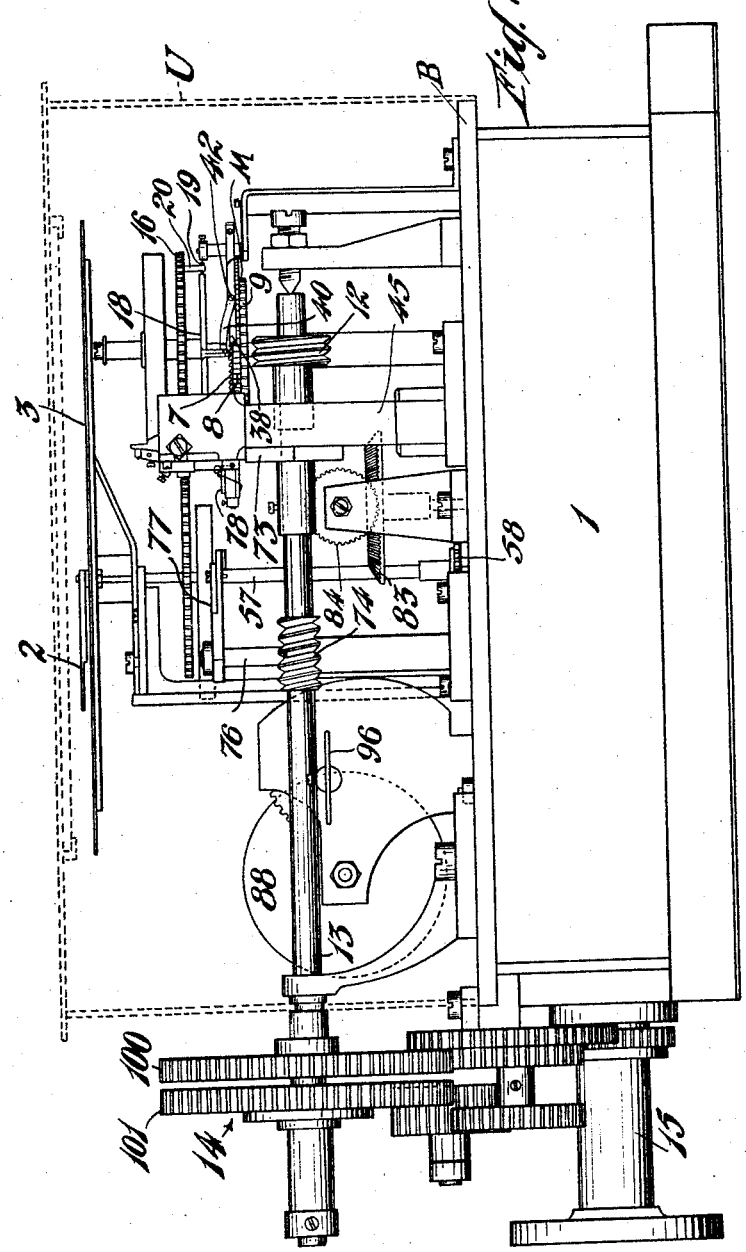

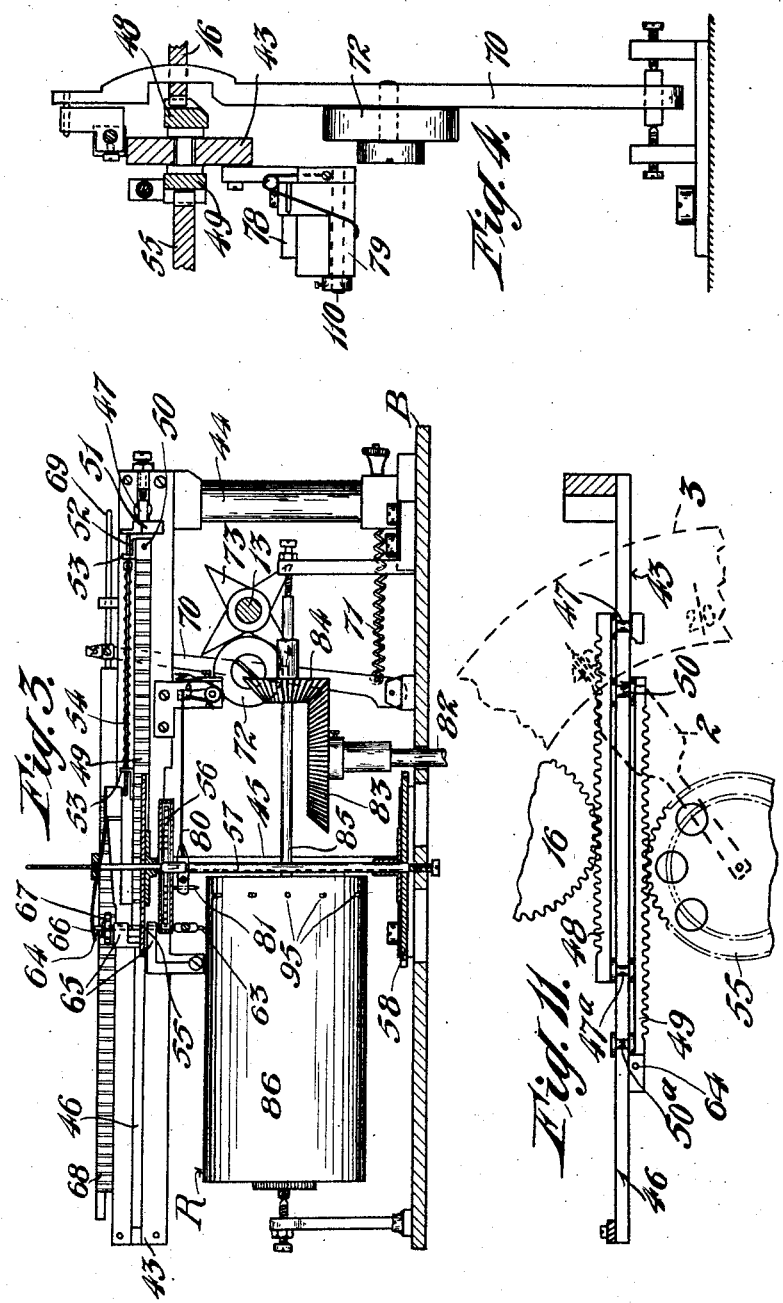

H. GALOPIN.
SPEED, TIME, AND QUANTITY RECORDING INSTRUMENT.
APPLICATION FILED JAN. 3, 1922.
1,421,352.  Patented June 27, 1922.
4 SHEETS—SHEET 4.
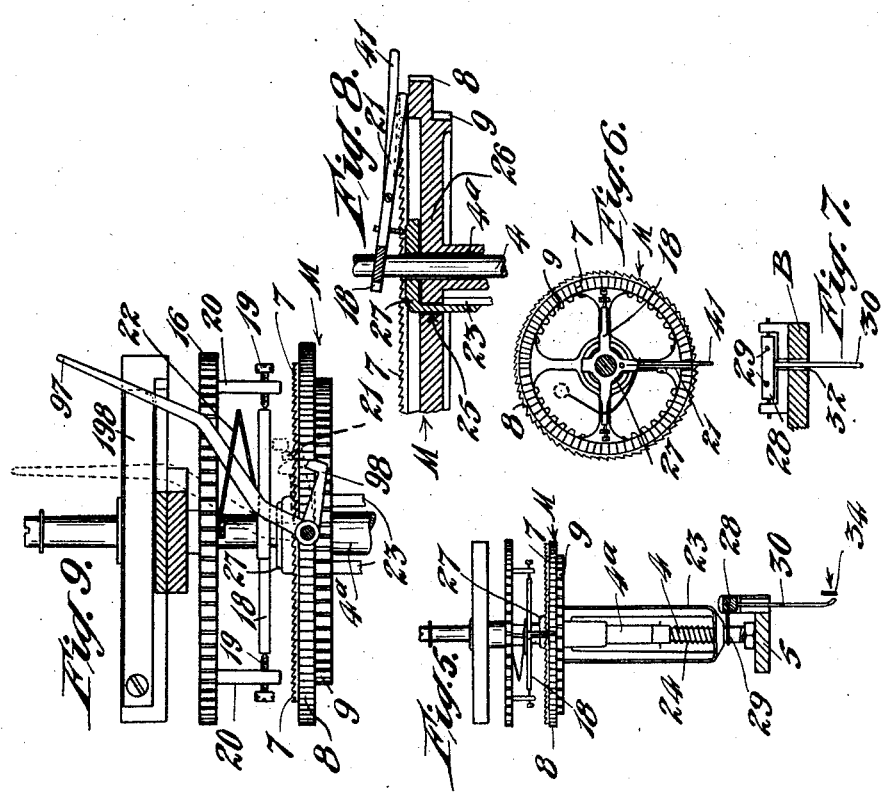
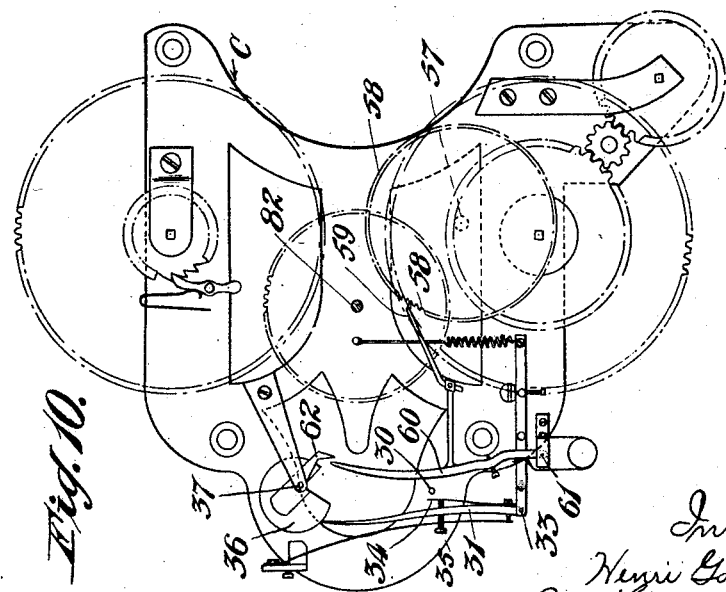

UNITED STATES PATENT OFFICE.

HENRI GALOPIN, OF MELBOURNE, VICTORIA, AUSTRALIA, ASSIGNOR TO WILLIAM MAXWELL BRUCE, OF TRARALGON, VICTORIA, AUSTRALIA, AND JOHN NORMAN MATHESON, OF SALE, VICTORIA, AUSTRALIA.

SPEED, TIME, AND QUANTITY RECORDING INSTRUMENT.

1,421,352. Specification of Letters Patent. Patented June 27, 1922.

Application filed January 3, 1922. Serial No. 526,865.

*To all whom it may concern:*

Be it known that HENRI GALOPIN, a subject of the King of Great Britain, residing at Little Collins Street, Melbourne, in the State of Victoria, Australia, has invented certain new and useful Improvements in Speed, Time, and Quantity Recording Instruments, of which the following is a specification.

This invention refers to instruments for graphically recording by automatic mechanism the speed, time, and quantity of work done by machinery either of the stationary or travelling type geared to rotary motion and the improvements have been devised with the object of providing a more simple and efficient instrument of this type.

Briefly stated a rack carrying a recording pencil is caused to travel variably across and in contact with a travelling record strip and also operate a spring controlled pinion actuating the finger of a visible calibrated quadrant for indicating the speed, said rack being operated by a parallel reciprocating rack actuated by another spring controlled oscillatory pinion. This pinion carries a pawl engaging a master wheel with crown and peripheral ratchet teeth rotated by a train of gear from the rotary shaft of the machine or travelling engine to which the recording instrument is coupled. The instrument incorporates clock work mechanism, the rotation of the escapement wheel thereof being utilized to operate means which periodically permits return rotation of the oscillatory pinion carrying the pawl and the pinion controlling the indicator finger.

Means are also provided to prevent damage to the pencil rack should the motion of the clock mechanism inadvertently stop and the invention incorporates other improvements described hereinafter.

A practical form of the invention is depicted in the accompanying drawings whereof:—

Fig. 2 is a rear side view of Fig. 1 with the speed indicator and indicating by broken lines the upper casing.

Fig. 3 is a transverse section on line III—III of Fig. 1.

Fig. 4 is an enlarged vertical section on line IV of Fig. 1.

Fig. 5 is a sectional rear elevation and

Figure 1:
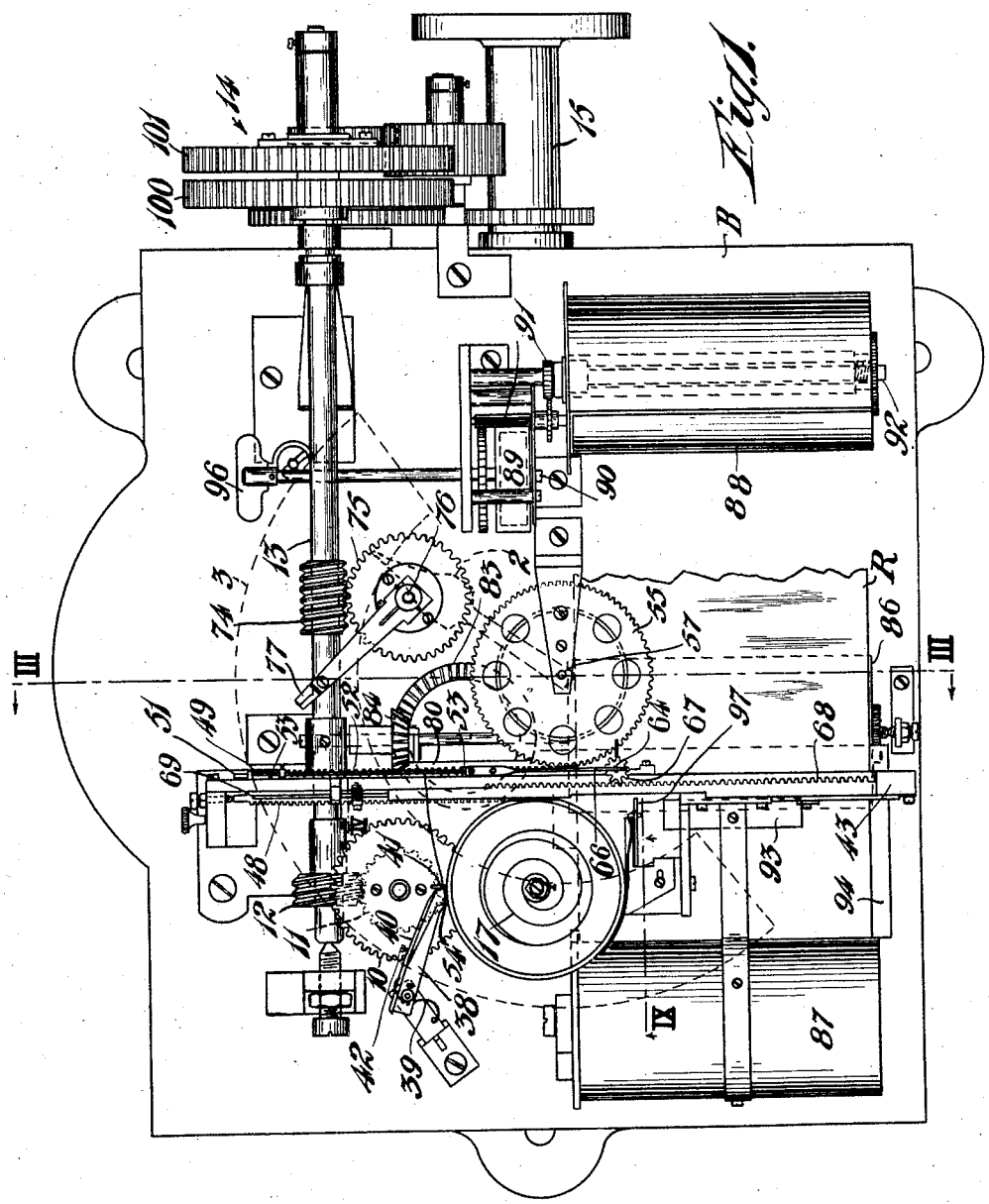
Fig. 1 is a plan of the instrument with the sides and top of the upper casing removed and also the speed indicator the location of which is shown by broken lines.

Fig. 6 a sectional plan of parts shewn particularly in Figs. 1 and 2.

Fig. 7 is a side elevation partly in section of a part of Fig. 5 and

Fig. 8 a further sectional detail.

Fig. 9 is an enlarged front sectional elevation of Fig. 5 as viewed from line IX in Fig. 1.

Fig. 10 is a plan of portion of the clock mechanism in the lower case shewing the relationship thereto of certain novel features of this invention.

Fig. 11 is a diagrammatic view illustrating the operation of the racks.

The mechanism consists of two parts, the clockwork gear C and a small portion of the invention, enclosed in the lower case 1, and the recording mechanism contained in an upper casing U indicated in broken lines Fig. 2 and containing in its cover a glass window through which the finger 2 and quadrant 3 of the speed indicator may be viewed.

The top of the lower case 1 is utilized as the base of the upper case.

The recording mechanism comprises a master wheel M fixed to a sleeve $4^a$ rotatable on a fixed vertical spindle 4 said wheel being formed with crown ratchet teeth 7, peripheral ratchet teeth 8 and gear teeth 9. The teeth 9 gear either direct or as illustrated through gearing 10, 11 the latter wheel gearing with a worm 12 on a shaft 13 operated by a train of gear 14 deriving motion from a shaft 15 which is readily coupled to a shaft of the travelling engine or machinery to which the instrument is to be coupled.

In regard to this reducing gear 14 between the machinery shaft and the main master wheel M the spindle 13 is rotatable only in one direction irrespective of the direction of rotation of the machinery shaft, said spindle having two juxtapositioned pinions 100 and 101 rotatable in opposite directions by means of internal pawl and ratchet mechanism not forming part of the invention.

On the spindle 4 an oscillatory pinion 16 is loosely mounted and controlled by a spring 17 Fig. 1 said pinion having fixed thereto on its underside a rocker 18 fulcrumed on pivots 19 fixed in lugs 20 on said pinion said rocker being formed with a pawl 21 controlled by a spring 22 and adapted to engage the crown ratchet teeth 7.

Thus through the medium of this pawl 21 the oscillatory pinion 16 travels with the master wheel M a portion of a revolution variable with the speed of the machinery shaft to which the instrument is coupled said oscillatory pinion then reversing by means of its spring when the pawl 21 is raised. This latter operation is effected periodically, as for instance eight times a minute by means of a skeleton sleeve 23 loosely encircling the spindle 4 and normally pressed downwardly by a spring 24. The upper end of the sleeve passes through slot 25 (Fig. 8) in the hub 26 of the master wheel M and is fitted with a head 27 located beneath the pawl 21.

The sleeve thus rotates with the wheel M and its head 27 is in position to lift the pawl, which is slightly inclined when the sleeve is periodically raised.

This latter object is accomplished by means of a bell crank Figs. 5 and 7 consisting of a pivoted rocker 28 provided with lateral pins 29 located beneath the conical lower end of the sleeve 23 and an arm 30 projecting downwardly through a slot 32 in the base plate B and operated intermittingly by a spring controlled lever 31 associated with the clock mechanism.

This lever 31 is pivoted at 33—Fig. 10—and is preferably provided with an adjustable contact spring 34 that may be regulated by a screw 35 and said lever is actuated by a suitably shaped cam 36, Fig. 10, on the spindle 37 of the escapement wheel of the clock mechanism.

The peripheral ratchet teeth 8 are engaged by a pawl 38, Fig. 1, actuated by a spring 39 and provided with an adjustable stop 40 and the pawl 21 has fixed to its side a projecting arm 41 the end of which abuts against said stop when the pawl springs back. By rotating the screw 42 of the stop 40 the position of the latter may be varied and the action of the pawl accurately adjusted.

The oscillatory pinion gears with and reciprocates a rack 48 Figs. 1, 4, and 11, slidably mounted on one side of a bridge 43 mounted on supports 44, 45 on the base B and extending across the travelling record strip of paper R.

The bridge is formed with a slot 46 and the rack is formed with lateral projections 47, 47$^a$ engaging said slot and extending therethrough.

On the opposite side of the bridge is another rack 49 similarly mounted and formed with lateral projections 50, 50$^a$ engaging the slot 46 said projections 50 being in front of projection 47.

Between the end projections 47 and 50 a buffer 51 may be inserted which is connected with a rod 52 slidably mounted in lugs 53 on the rack 49 and controlled by a spring 54 on said rod.

The rack 49 engages a gear wheel 55 controlled by a spring 56 and mounted on a vertical spindle 57, Figs. 1 to 3, to which is fixed the speed indicator finger 2 which traverses the calibrated quadrant 3 to visibly indicate the speed.

To the lower end of said spindle 57 is fixed a ratchet wheel 58—Figs. 3 and 10—engaged by a pawl 59 fixed to and adapted to be periodically released by a lever 60 pivoted at 61 and actuated by an arm 62 or a cam, on the spindle 37 of the escapement wheel. The arm 62 is adapted to operate lever 60 to release pawl 59 slightly in advance of the operation of the slotted cam 36 in releasing lever 31 to release pawl 21 from the master wheel M. It will be evident that arm 62 and cam 36 might be integral, i. e., a compound cam for the dual purposes of cam 36 and arm 62 might be employed.

The pencil 63 for marking the record strip R is fixed to a spindle 64 mounted in bearings 65 on rack 49 and held down on the strip by a spring 66 and fixed to said spindle is a pinion 67 engaging a rack 68 suitably guided to reciprocate on the top of the bridge 43. For this purpose the guide rod 69 of the rack is connected to a lever 70 controlled by a spring 71 and provided with a roller 72 actuated for instance by a star wheel 73 on the main shaft 13 of the transmission gear. This mechanism causes rotation of the pencil 63 and ensures a plain marking of the diagram of speed and time of work on the record strip R.

On the shaft 13 is a worm 74 gearing with a worm wheel 75 on a spindle 76 carrying an arm 77 (Figs. 1 and 2) which is adapted periodically to strike an offset projection 78, on a spring controlled rocker 79 pivoted on pin 110 on the bridge and formed with a spring arm 80 carrying another pencil 81, which, with a sliding action marks one edge of the record strip when the rocker 79 is rocked by the striking of the arm 77 against the projection 78 to indicate distance travelled or revolutions in a definite period.

The spindle 82 of the wheel controlling the hour hand of the clock mechanism is provided with a bevel gear pinion 83 meshing with another pinion 84 on a shaft 85 carrying a feed drum 86 for the record strip R, which travels beneath the recording pencils 63 and 81 from a slotted cylinder 87 to a spring controlled winding roller or drum 88 also preferably slotted. This roller 88 is kept in tension by an enclosed spring 89 attached to a spindle 90, intermediate gearing 91 Fig. 1 being provided between this spindle and the spindle 92 of the roller 88 and said spring being put in tension by the key 96.

The paper strip R is kept in contact with the feed drum 86 by means of a spring clamp plate 93 bearing upon an adjacent flat table 94 and it is guided by equally spaced pins 95 Fig. 3 on said feed drum engaging correspondingly distanced punctures formed in the strip R near one edge thereof.

If the clock mechanism should stop the pawl 21 would not be lifted from wheel 7 and the pinion 16 carrying pawl 21 would complete a revolution thus driving the rack 48 out of the bridge 43 and damage to the mechanism would result. In order therefore to prevent this happening the pawl 21 is adapted to contact with a lever 97 formed with a hook 98 (Fig. 9) controlled by a spring 198 so that the lever is pressed back as shown by broken lines and its hook is raised thus lifting pawl 21 out of engagement with the ratchet teeth 7 of the master wheel and stopping further rotation of the pinion 16 and lineal travel of the associated rack 48.

The lever 97 is subsequently manually operated in reverse manner to release the pawl 21 and allow the spring 17 of the pinion 16 to reverse the latter and restore the mechanism again in working condition.

The operation of the main mechanism of this instrument is as follows:—

The master wheel M is rotated while the shaft of the machinery coupled to shaft 15 is revolving by pinion 10 and the train of gearing associated therewith, at a speed varying with that of the shaft of the machinery by means of the pawl 21 on the oscillatory pinion 16. The latter rotates a portion of a revolution during for instance one eighth of a minute, and correspondingly moves lineally forward the transmission rack 48 geared with said pinion. The function of the rack 48 is to transmit to the parallel rack 49, carrying the pencil 63, a corresponding forward lineal movement which thus operates the pinion 55 of the speed indicator finger 2 which traverses the calibrated quadrant 3 and shows the rate of speed per hour.

This transmission between the racks is caused by the projection 47 of rack 48 engaging the adjacent projection 50 on rack 49 or the intervening spring buffer 51 thereon.

The first or transmission rack 48 is periodically returned by the sudden reverse movement of the oscillatory pinion 16 owing to release of its pawl 21 from ratchet teeth 7 of the master wheel M which is effected through sleeve 23, rocker 28, lever 31 and cam 36 on the spindle 37 of the escapement wheel of the clockwork mechanism, said pawl 21 being stopped by its arm 41 abutting against the stop 40.

Immediately before this release movement, lever 60 is operated by arm 62 on escapement wheel spindle 37 which momentarily releases pawl 59 from ratchet wheel 58 controlling the spindle 57 of the speed indicator finger 2. Thus as in Fig. 11 the speed recording rack 49 carrying the pencil 63 may travel backwards to indicate and record reduced speed until it meets the projection 47 on the transmission rack 49 which projection has not advanced to the projection 50 on account of reduced speed. Pawl 59 then again engaging a tooth of ratchet wheel 58 and the recording rack remains stationary during one eighth of a minute. It is immediately after this re-engagement of pawl 59 with ratchet wheel 58 that pawl 21 is released and pinion 16 quickly reverses and likewise rack 48.

It will thus be understood that the release of the pawl 59 controlling the speed indicator pinion 55 permits the finger 2 to move along the quadrant towards zero and at the same time the rack 49 carrying the pencil 63 to slide backwardly, if the speed of the machinery is reduced during the previous period of one eighth of a minute. On the other hand when rack 48 advances it meets rack 49, now held against reverse movement by pawl 59, so that if the speed has increased it moves forward rack 49 carrying the pencil and correspondingly varies finger 2.

The effect of these movements is to cause the pencil 63 to make a correct record of the speed on the travelling strip of paper R and show by a graph the work of the machinery at any time of the day and the periods at which said machinery was not in action.

I claim:—

1. In an indicating and recording mechanism, a record strip moving mechanism, a straight reciprocating rack periodically and positively moved to and from its zero position, a second rack slid to recording position by said first rack, means gearing with said second rack to periodically return said second rack to the position assumed by said first rack.

2. In an indicating and recording mechanism, a record strip moving mechanism, a straight reciprocating rack, a wheel gearing therewith and positively driven from the machine to be indicated for a fraction of a revolution, a second straight rack slid from a lower to a higher indicating position by said first rack, an indicator, a wheel thereon meshing with said rack and means to periodically reversely rotate said second wheel before said first rack is returned to zero position, and a recording stylus carried by said second rack.

3. In an indicating and recording mechanism, a record strip moving mechanism, a reciprocable straight rack, a spring-returned driving wheel for the rack, a continuously driven ratchet wheel, a pawl on said driving wheel engaging said ratchet wheel, clock driven mechanism to periodically release said pawl before making a complete revolution and means to permanently hold said pawl inoperative upon cessation of movement of the clock driven mechanism.

4. In an indicating and recording mechanism, a clock mechanism, a record strip whose movement is controlled thereby, a straight rack, a spring retracted wheel gearing therewith, a continuously driven master wheel, means controlled by said clock mechanism to periodically couple the two wheels, a second straight reciprocable recording rack, a spring retracted indicator gearing with said second rack, said first rack arranged to move the recording rack in one direction, means controlled by said clock mechanism to release said indicator to permit said recording rack to assume the position of the first rack and means to thereafter release said first rack for return to its zero position.

5. In an indicating and recording mechanism, a master wheel having a crown ratchet, a gear driven from the machine whose speed is to be measured and a ratchet rim; a rack driving, spring retracted gear; a clock controlled pawl to connect the latter gear to said crown and ratchet, an adjustable zero stop for said pawl, a pawl held, spring retracted indicator, means to release said indicator and again hold it before disconnecting said spring retracted gear, a driving rack meshing with said spring retracted gear and a recording rack co-operating therewith and operated from said indicator.

6. In an indicating and recording instrument, a rack, a stylus on said rack, mechanism to periodically move said rack in accordance with the speed to be recorded, and means to rotate said stylus during the movement of said rack.

7. In an indicating and recording instrument, a bridge, a reciprocable rack, a stylus carried thereby and mechanism for reciprocating said rack periodically, to record speed at determined intervals, a rotatable arm, a rocker on said bridge in the path of said arm, a second stylus carried by said rocker for recording distance, and mechanism to rotate said arm continuously from the shaft whose speed is to be indicated and recorded.

8. In an indicating and recording instrument, a recording rack, an indicator shaft, a gear on said shaft meshing with said rack, a ratchet wheel on said shaft, a pawl for said ratchet wheel, a second rack arranged to reciprocate the first rack, means for moving the latter rack in accordance with the speed to be indicated and clock-controlled releasing mechanism to release said pawl slightly in advance of the release of said means.

Dated this 28th day of November, 1921.
HENRI GALOPIN.